(12) United States Patent
Kim et al.

(10) Patent No.: US 11,863,226 B2
(45) Date of Patent: Jan. 2, 2024

(54) COMMUNICATION DEVICE AND OPERATING METHOD THEREOF

(71) Applicant: SAMSUNG ELECTRONICS CO., LTD., Suwon-si (KR)

(72) Inventors: Youngmin Kim, Yongin-si (KR); Hongjong Park, Seoul (KR); Iljin Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/661,080

(22) Filed: Apr. 28, 2022

(65) Prior Publication Data
US 2023/0063376 A1 Mar. 2, 2023

(30) Foreign Application Priority Data
Aug. 25, 2021 (KR) .......................... 10-2021-0112470

(51) Int. Cl.
*H04B 1/40* (2015.01)
*H04L 27/26* (2006.01)
*H04B 1/04* (2006.01)

(52) U.S. Cl.
CPC ............. *H04B 1/40* (2013.01); *H04B 1/0475* (2013.01); *H04L 27/2636* (2013.01)

(58) Field of Classification Search
CPC ...... H04B 1/40; H04B 1/0475; H04L 27/2636
USPC .......................... 375/148, 219–222, 299, 319
See application file for complete search history.

(56) References Cited

U.S. PATENT DOCUMENTS

| 7,876,867 | B2 | 1/2011 | Filipovic et al. | |
| 8,000,756 | B2 | 8/2011 | Beck et al. | |
| 8,180,308 | B1 | 5/2012 | Neng et al. | |
| 8,948,717 | B2 | 2/2015 | Winoto et al. | |
| 8,995,502 | B1* | 3/2015 | Lai | H04B 1/38 375/219 |
| 11,016,922 | B2 | 5/2021 | Sobelman | |
| 2007/0058707 | A1* | 3/2007 | Trutna | H04W 72/02 375/224 |
| 2009/0219855 | A1* | 9/2009 | Ishii | H04L 1/1887 370/328 |
| 2012/0034895 | A1 | 2/2012 | Xuechu et al. | |

(Continued)

*Primary Examiner* — Emmanuel Bayard
(74) *Attorney, Agent, or Firm* — F. CHAU & ASSOCIATES, LLC

(57) ABSTRACT

The present disclosure provides a communication device and an operating method. The communication device includes an antenna, a transmission processor, a radio frequency chain, and a reception processor. The transmission processor is configured to output a second transmission input signal with the same average power as the average power of a first transmission input signal and a second amplitude greater than a first amplitude of the first transmission input signal. The RF chain is configured to output an RF output signal to be transmitted through the antenna, based on a transmission input signal, and to output a reception input signal based on a signal received through the antenna. The reception processor is configured to check an out-of-band blocker by detecting a peaked frequency spectrum based on the reception input signal and to adjust a reception characteristic parameter of the RF chain based on an amplitude of the peaked frequency spectrum.

20 Claims, 15 Drawing Sheets

(56) References Cited

U.S. PATENT DOCUMENTS

| | | | |
|---|---|---|---|
| 2015/0280673 A1* | 10/2015 | Tasic | H03G 3/3036 |
| | | | 455/234.1 |
| 2016/0112074 A1* | 4/2016 | Lascari | H04B 1/3805 |
| | | | 455/230 |
| 2018/0316399 A1* | 11/2018 | Murakami | H04L 27/20 |
| 2019/0200270 A1* | 6/2019 | Yu | H04L 25/063 |
| 2019/0253114 A1* | 8/2019 | Murakami | H04L 27/34 |
| 2020/0358463 A1 | 11/2020 | Alam et al. | |
| 2020/0358465 A1 | 11/2020 | Alam et al. | |
| 2021/0075101 A1* | 3/2021 | Kim | H01Q 21/22 |
| 2021/0105817 A1* | 4/2021 | Nguyen | H04B 17/327 |
| 2022/0400044 A1* | 12/2022 | Paz | H04L 1/0026 |

\* cited by examiner

COMMUNICATION DEVICE AND OPERATING METHOD THEREOF

CROSS-REFERENCE TO RELATED APPLICATION

This application is based on and claims priority under 35 U.S.C. § 119 to Korean Patent Application No. 10-2021-0112470, filed on Aug. 25, 2021, in the Korean Intellectual Property Office, the disclosure of which is incorporated by reference herein in its entirety.

BACKGROUND

The inventive concept relates to an electronic device, and more particularly, to a communication device and an operating method thereof.

Wireless communication networks provide the ability for users, or devices, to transfer data between communication devices such as mobile phones, computers, and the like. The communications devices include a receiver to process an input signal from other devices.

Receivers perform communication using frequency division duplexing (FDD), which can cause a degradation in a signal to noise ratio (SNR) due to interferences such as transmitter (TX) leakage and an out-of-band blocker. The TX leakage and the out-of-band blocker are 3rd intercept point (IP3) indicators and can degrade the SNR of the receivers.

As such, the power supplied to the receiver can be increased to improve the IP3 indicators. But, when an increased amount of power is supplied to the out-of-band blocker, the efficiency decreases. Therefore, there is a need in the art for an improved efficiency of a receiver.

SUMMARY

The inventive concept provides a communication device that detects an out-of-band blocker to improve linearity and an operating method thereof.

According to an aspect of the inventive concept, there is provided a communication device including an antenna, a transmission processor configured to output a second transmission input signal with the same average power as average power of a first transmission input signal and a second amplitude that is greater than a first amplitude of the first transmission input signal, a radio frequency (RF) chain configured to output an RF output signal that is to be transmitted through the antenna, based on a transmission input signal provided from the transmission processor, and to output a reception input signal based on a signal received through the antenna, and a reception processor configured to check an out-of-band blocker by detecting a peaked frequency spectrum based on the reception input signal and to adjust a reception characteristic parameter of the RF chain based on an amplitude of the peaked frequency spectrum.

According to another aspect of the inventive concept, there is provided a communication device including an antenna, a modem configured to output a transmission input signal and to process a reception input signal, and an RF chain configured to output an RF output signal that is to be transmitted through the antenna, based on the transmission input signal and to output a reception input signal based on a signal received through the antenna, wherein the modem is configured to calculate an SNR based on the reception input signal, to change the first transmission input signal to the second transmission input signal based on whether the SNR is less than a reference SNR, and to detect a peaked frequency spectrum based on the reception input signal and to adjust a reception characteristic parameter of the RF chain based on an amplitude of the peaked frequency spectrum.

According to another aspect of the inventive concept, there is provided an operating method of a communication device including an antenna, an RF chain, and a modem, the operating method including checking a degradation in an SNR based on a reception input signal generated by the RF chain, changing a first transmission input signal to a second transmission input signal in response to the degradation in the SNR being checked, performing a Fourier transform on the reception input signal to detect a peaked frequency spectrum that is greater than or equal to at least one reference amplitude, thereby detecting an out-of-band blocker, and adjusting a reception characteristic parameter of the RF chain based on an amplitude of the peaked frequency spectrum, wherein the second transmission input signal has the same average power as average power of the first transmission input signal and a second amplitude that is greater than a first amplitude of the first transmission input signal.

According to another aspect of the inventive concept there is provided a method comprising checking a degradation in an SNR of a reception input signal generated by an RF chain; changing a first transmission input signal to a second transmission input signal based on the degradation, wherein the second transmission input signal has a same average power as the first transmission input signal and an amplitude that is greater than the first transmission input signal; determining that a peaked frequency spectrum of noise in the reception input signal is greater than or equal to at least one reference amplitude; and adjusting a reception characteristic parameter of the RF chain based on the peaked frequency spectrum.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
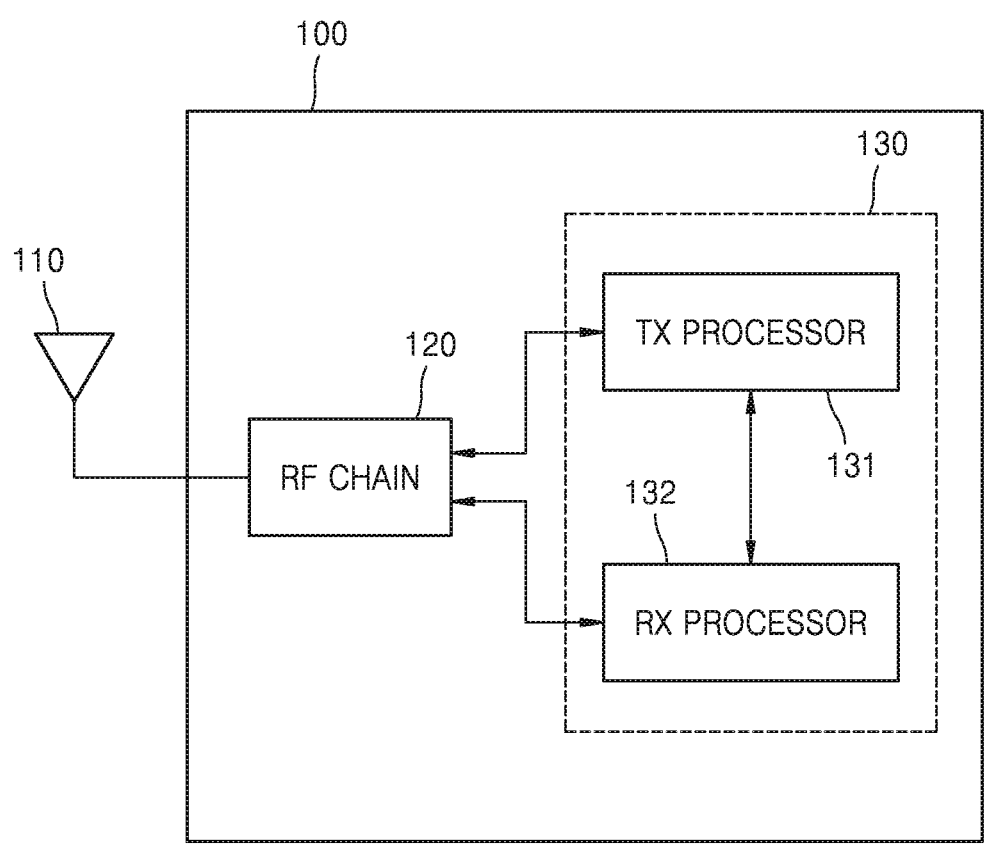
FIG. 1 is a diagram for describing a communication device according to an embodiment.

The present disclosure relates generally to an electronic device, and more particularly, to a communication device and an operating including a reception processor. In some embodiments, the present disclosure provides a reception processor to detect a frequency spectrum an out-of-band blocker and may adjust the reception characteristics of a radio frequency chain.

Receivers that communicate based frequency division duplexing (FFD) often ensure some level of signal to noise ratio (SNR) declination due to interference. For example, TX leakage and an out-of-band blockers may be are IP3 indicators that cause interference. As the power (current) of the receivers increases, feedback in the system can improve the IP3 indicators. Alternatively, when the amount of power increases for the out-of-band blocker, the efficiency of power consumption of the receiver decreases.

Therefore, the present disclosure provides a communication device and an operating method including an antenna, a transmission processor, a radio frequency chain, and a reception processor. The transmission processor outputs a second transmission input signal with the same average power as the average power of a first transmission input signal and a second amplitude greater than a first amplitude of the first transmission input signal. The RF chain outputs an RF output signal to be transmitted through the antenna, based on a transmission input signal, and outputs a reception input signal based on a signal received through the antenna. The reception processor checks an out-of-band blocker by detecting a peaked frequency spectrum based on the reception input signal and to adjust a reception characteristic parameter of the RF chain based on an amplitude of the peaked frequency spectrum.

Hereinafter, embodiments will be described in detail with reference to the accompanying drawings. Embodiments of the inventive concept are provided so that the disclosure will be thorough and complete, and will fully convey the concept of the inventive concept to one of ordinary skill in the art. The inventive concept may have various modified embodiments, and preferred embodiments are illustrated in the drawings and are described in the detailed description of the inventive concept. However, the inventive concept within specific embodiments is not limited and it should be understood that the inventive concept covers all the modifications, equivalents, and replacements within the idea and technical scope of the inventive concept. Like reference numerals refer to like elements throughout. Herein, "first" and "second" are merely used for differentiating the terms, and the inventive concept is not limited thereto.

FIG. 1 is a diagram for describing a communication device 100 according to an embodiment.

Referring to FIG. 1, the communication device 100 according to an embodiment may include an antenna 110. The number of antennas 110 may be one or more. The communication device 100 may transmit or receive a signal through the antenna 110 Therefore, the communication device 100 may communicate with another communication device or a base station. A wireless communication system performed by the communication device 100 may be, for example, a wireless communication system using a cellular network such as a 5th generation (5G) wireless system, a long term evolution (LTE) system, an LTE-advanced system, a code division multiple access (CDMA) system, or a global system for mobile communication (GSM) system. Alternatively, the wireless communication system may be, for example, a wireless local area network (WLAN) system. However, the inventive concept is not limited thereto.

In an embodiment, the communication device 100 may perform communication based on a frequency division duplexing (FDD) scheme. However, the inventive concept is not limited thereto.

In an embodiment, the communication device 100 may further include a radio frequency (RF) chain 120 and a modem 130. The RF chain 120 may amplify a signal generated by the modem 130, or may remove noise of the signal. Additionally, or alternatively, the RF chain 120 may output the amplified or noise-removed signal to the antenna 110. The amplified or noise-removed signal may be transmitted to the outside through the antenna 110. A signal to be transmitted to the outside through the antenna 110 may be referred to as an RF output signal.

The RF chain 120 may amplify a signal received from the outside through the antenna 110 or may remove noise of the received signal. Additionally, or alternatively, the RF chain 120 may output the amplified or noise-removed signal to the modem 130. A signal provided to the modem 130 may be referred to as a reception input signal.

The RF chain 120 may be implemented with a plurality of circuits, to perform the operations described above. The number of RF chains 120 may be one or more. When each of the number of antennas 110 and the number of RF chains 120 is in plurality, the number of RF chains 120 may be less than the number of antennas 110. In this case, the communication device 100 may select an antenna corresponding to the number of RF chains.

The modem 130 may process a transmission/reception signal of a baseband. For example, the modem 130 may generate a baseband signal for a transmission signal path of the RF chain 120 and may process the baseband signal received through a reception signal path of the RF chain 120.

In an embodiment, the modem 130 may include a transmission processor 131 that outputs the transmission input signal, and a reception processor 132 that processes the reception input signal.

In an embodiment, the transmission processor 131 may output a first transmission input signal while the communication device 100 is performing a communication operation. Additionally, or alternatively, the transmission processor 131 may output a second transmission input signal in a period where the communication device 100 prepares for a communication operation. Average power of the first transmission input signal may be the same as average power of the second transmission input signal. Average power may be calculated as an integral value of a frequency in a frequency spectrum of the first transmission input signal. An amplitude of the first transmission input signal may be lower than an amplitude of the second transmission input signal. For example, a frequency spectrum of the second transmission input signal may have a relatively narrow bandwidth and a relatively large amplitude compared to a frequency spectrum of the first transmission input signal. A period where a communication operation is prepared may be a period where the communication device 100 does not communicate with another communication device and stands by. Alternatively, a period where a communication operation is prepared may be a period where a communication characteristic between the communication device 100 and another communication device is set, and for example, may be a period corresponding to a length of a cyclic prefix (CP). Accordingly, a communication state may be maintained. Therefore, a degradation in communication quality may be prevented.

In another embodiment, when a degradation in a signal to noise ratio (SNR) occurs, the second transmission input signal may be output. Even in this case, the transmission processor 131 may output the second transmission input signal at a period where the communication device 100 prepares for a communication operation.

SNR degradation may be a state where an SNR used in a current communication operation is lower than a criterion used by the communication device 100. SNR degradation may occur due to various causes such as multiple path propagation, the weather (particularly, cloudy weather), and an obstacle (or a shadow of an obstacle) adversely affecting propagation.

In an embodiment, the reception processor 132 may check SNR degradation. For example, the reception processor 132 may calculate an SNR based on the reception input signal received from the RF chain 120 and may compare the calculated SNR with a predetermined reference SNR. When the calculated SNR is less than the reference SNR, the reception processor 132 may determine that SNR degradation occurs. At this time, the reception processor 132 may provide the transmission processor 131 with a comparison result signal representing a comparison result between the calculated SNR and the reference SNR. When an SNR is greater than or equal to the reference SNR, the transmission processor 131 may output the first transmission input signal to the RF chain 120. Alternatively, when the SNR is less than or equal to the reference SNR, the transmission processor 131 may output the second transmission input signal to the RF chain 120. The second transmission input signal, as described above, may be output at a period where a communication operation is prepared.

In another embodiment, the reception processor 132 may calculate an SNR based on the reception input signal. The comparing with a frequency spectrum of the first transmission input signal may then compare the calculated SNR with the reference SNR. When the calculated SNR is less than the reference SNR, the reception processor 132 may provide the transmission processor 131 with a flag signal representing the occurrence of SNR degradation. The transmission processor 131 may change the first transmission input signal to the second transmission input signal in response to the flag signal. The second transmission input signal, as described above, may be output at a period where a communication operation is prepared.

In an embodiment, while the second transmission input signal output, the reception input signal may be provided to the reception processor 132. The reception processor 132 may detect a peaked frequency spectrum based on the reception input signal to check an out-of-band blocker. The peaked frequency spectrum may be a frequency spectrum of noise in the reception input signal. The noise in the reception input signal may include, for example, an out-of-band blocker and a leaked transmission input signal. The out-of-band blocker may be noise outside a band of a desired reception frequency. Herein, the leaked transmission input signal may be referred to as a leakage transmission input signal. The reception processor 132 may adjust a reception characteristic parameter of the RF chain 120 based on an amplitude of the peaked frequency spectrum. The reception characteristic parameter of the RF chain 120 may be a parameter set for satisfying a linearity. An indicator for determining linearity may be, for example, a third order intercept point (IP3).

Figure 2:
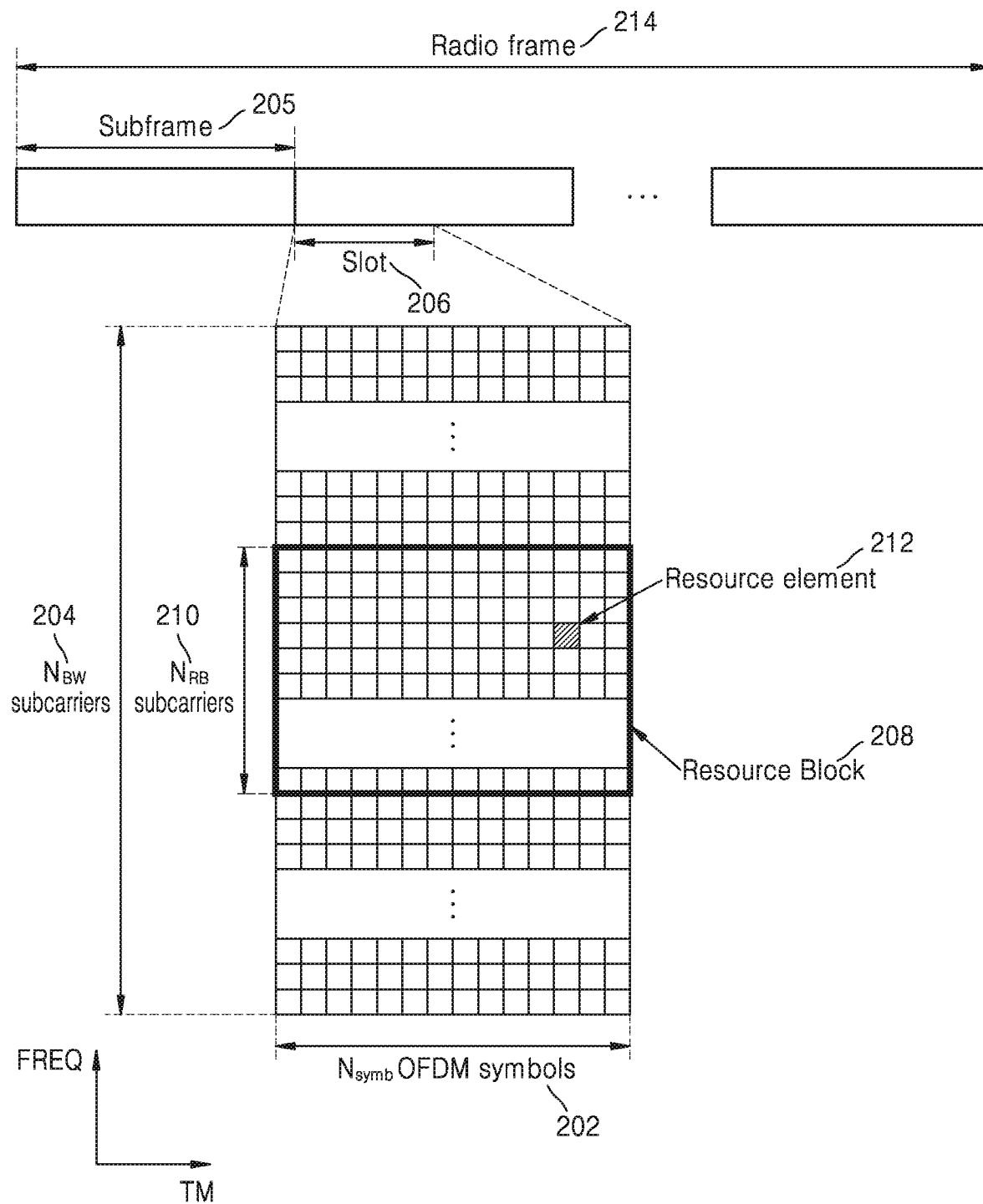
FIG. 2 is a diagram for describing a time-frequency resource provided by a communication device according to an embodiment.

FIG. 2 is a diagram for describing a time-frequency resource provided by a communication device according to an embodiment.

Referring to FIG. 2, the abscissa axis may represent a time domain TM, and the ordinate axis may represent a frequency domain FREQ. A minimum unit of resource allocation in the time domain TM may be an orthogonal frequency division multiplexing (OFDM) symbol, Nsymb (202) number of OFDM symbols may configure one slot 206, and N (where N is an integer of 1 or more) number of slots may configure one sub-frame 205. Additionally, or alternatively, one radio frame 214 may be one unit of the time domain TM including ten sub-frames 205. A minimum unit of resource allocation in the frequency domain FREQ may be a subcarrier, and a total bandwidth of a communication system may be configured with total NBW (204) number of subcarriers.

A basic unit of a resource in a time-frequency domain may be a resource element (RE) 212 and may be represented as an OFDM symbol index and a subcarrier index. A resource block (RB) 208 may be defined as Nsymb (202) number of continuous OFDM symbols in the time domain TM and NRB (210) number of continuous subcarriers in the frequency domain FREQ. Therefore, one RB 208 may be configured with (Nsymb*NRB) number of REs 212, and a size of the RB 208 may correspond to the number of REs 212.

As a plurality of numerologies are supported in communication based on an NR network, a length of each of a subcarrier spacing (SCS) and a slot 206 may vary, and the number of slots configuring one sub-frame 205 of 1 ms may be determined by a numerology of a wireless communication system. For example, referring to FIG. 4, a length of the slot 206 may be 0.5 ms, two (N=2) slots may configure one sub-frame 205, and one slot may be configured with fourteen (Nsymb=14) OFDM symbols. This is merely an example, and one slot may be configured with twelve (Nsymb=12) OFDM symbols. The inventive concept described above may be applied to a wireless communication system that supports another numerology.

Additionally, or alternatively, a physical downlink control channel (PDCCH) and a downlink channel including a physical downlink shared channel (PDSCH) and the like may be transmitted from a base station to a terminal in a wireless communication system.

In an embodiment, the first transmission input signal may include a first RB, and the second transmission input signal may include a second RB. A size of the first RB may be greater than that of the second RB. Referring to FIG. 2, for example, the second RB may include one RB 208, and the first RB may include 100 RBs 208. However, the inventive concept is not limited thereto.

In another embodiment, the first transmission input signal may include the first RB, and the second transmission input signal may be a continuous wave with a single frequency.

Figure 3A:
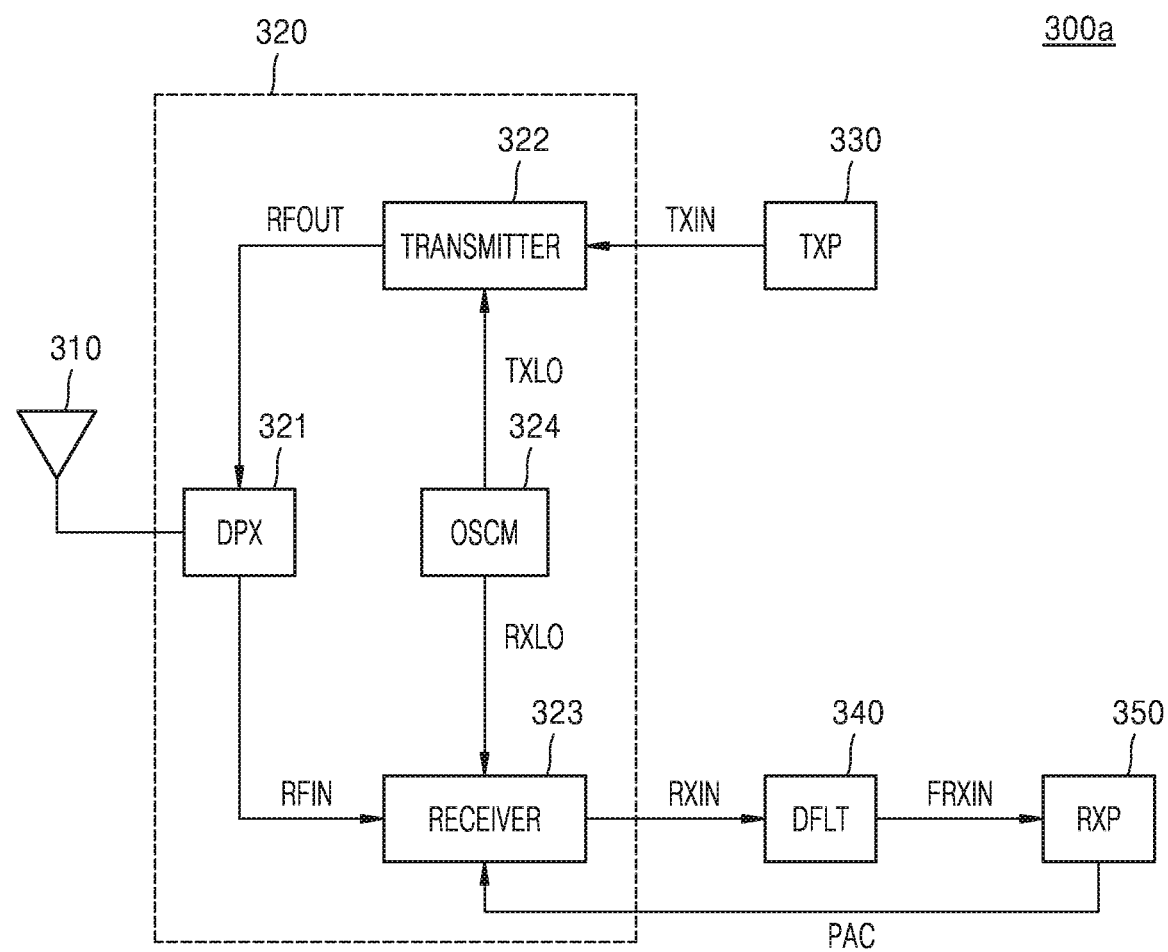
FIGS. 3A and 3B are diagrams for describing embodiments of a communication device.
Figure 3B:
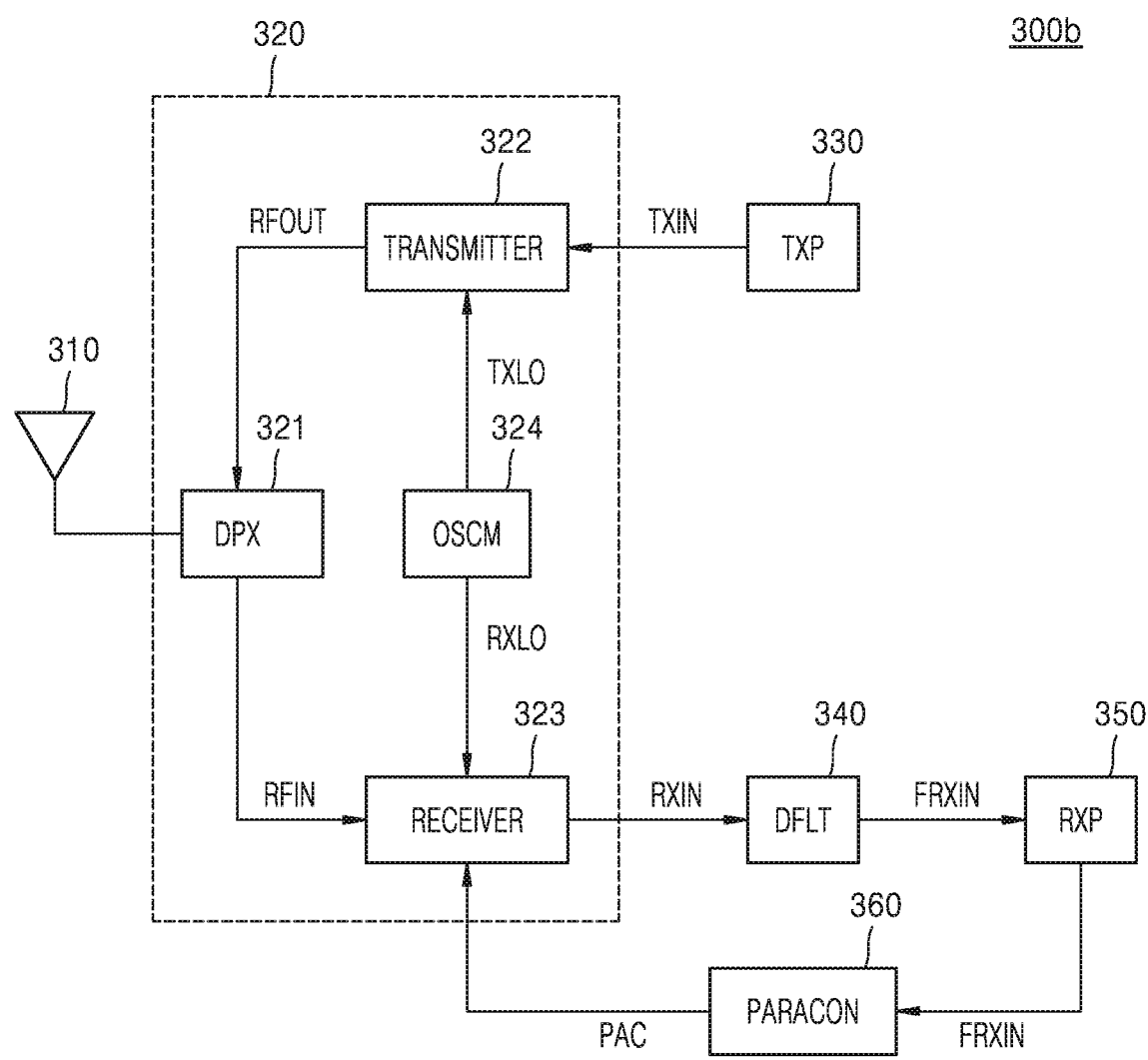

FIGS. 3A and 3B are diagrams for describing embodiments of a communication device.

Referring to FIG. 3A, a communication device 300a may include an antenna 310, an RF chain 320, a transmission processor 330, a digital filter 340, and a reception processor 350.

The RF chain 320 may include a transmission/reception duplexer 321, a transmitter 322, a receiver 323, and an oscillation circuit module 324. The transmission/reception duplexer 321 may provide a signal, received through the antenna 310, as an RF input signal RFIN to the receiver 323. Additionally, or alternatively, the transmission/reception duplexer 321 may provide the antenna 310 with an RF output signal RFOUT received from the transmitter 322.

The transmitter 322 may process a transmission input signal TXIN received from the transmission processor 330 to generate the RF output signal RFOUT. The receiver 323 may process the RF input signal RFIN to generate a reception input signal RXIN and may provide the reception input signal RXIN to the digital filter 340.

The oscillation circuit module 324 may generate a reference clock with a frequency for sampling the reception input signal RXIN and the RF input signal RFIN. Additionally, or alternatively, the oscillation circuit module 324 may provide the reference clock to each of the transmitter 322 and the receiver 323. For example, the oscillation circuit module 324 may provide the transmitter 322 with a transmission reference clock TXLO for sampling the transmission input signal TXIN and may provide the receiver 323 with a reception reference clock RXLO for sampling the RF input signal RFIN.

A center frequency of the RF input signal RFIN may be greater than a center frequency of the reception input signal RXIN. Additionally, or alternatively, the center frequency of the reception input signal RXIN may be included in a baseband. Therefore, the reception input signal RXIN may be a signal obtained through down-conversion of the RF input signal RFIN by the receiver 323.

The transmission processor 330 may output the transmission input signal TXIN to the transmitter 322. The transmission input signal TXIN may be the first transmission input signal or the second transmission input signal described above with reference to FIG. 1. For example, while a communication operation is being performed, the transmission processor 330 may output the first transmission input signal to the transmitter 322. Additionally, or alternatively, the transmission processor 330 may output the second transmission input signal to the transmitter 322 in a period where a communication operation is prepared, in response to the flag signal received from the reception processor 350 and described above with reference to FIG. 1.

The digital filter 340 may filter the reception input signal RXIN to provide a filtered reception input signal FRXIN to the reception processor 350.

The reception processor 350 may calculate an SNR based on the filtered reception input signal FRXIN. Additionally, or alternatively, the reception processor 350 may check the occurrence or not of SNR degradation. This is as described above with reference to FIG. 1. When SNR degradation occurs, the reception processor 350 may output the flag signal to the transmission processor 330.

The reception processor 350 may detect a peaked frequency spectrum based on the filtered reception input signal FRXIN when the RF input signal RFIN is received by the receiver 323 while the second transmission input signal is being output to the RF chain 32. For example, the reception processor 350 may perform a Fourier transform on the filtered reception input signal FRXIN. The Fourier transform may include a fast Fourier transform (FFT). When the FFT is performed, a frequency spectrum of the filtered reception input signal FRXIN and a frequency spectrum of noise may be generated. The reception processor 350 may detect, as a peaked frequency spectrum, a frequency spectrum corresponding to a predetermined condition among frequency spectrums. This will be described below with reference to FIGS. 9A and 9B.

The reception processor 350 may adjust a reception characteristic parameter based on an amplitude of the detected peaked frequency spectrum. For example, the reception processor 350 may provide the receiver 323 with a parameter control signal PAC that controls the reception characteristic parameter, based on the amplitude of the peaked frequency spectrum. Here, the reception characteristic parameter may be, for example, a parameter of the receiver 323. For example, the reception characteristic parameter may include a current used by the receiver 323, a gain of the receiver 323, and a filter characteristic of the receiver 323.

In another embodiment, a circuit implemented independently from the reception processor 350 may detect the peaked frequency spectrum described above and an operation of adjusting the reception characteristic parameter.

Referring to FIG. 3B, a communication device 300b may further include a parameter controller 360. The parameter controller 360 may receive the filtered reception input signal FRXIN from the reception processor 350. The parameter controller 360 may detect the peaked frequency spectrum in the filtered reception input signal FRXIN and an operation of adjusting the reception characteristic parameter. The parameter controller 360 may provide the parameter control signal PAC to the receiver 323.

Figure 4:
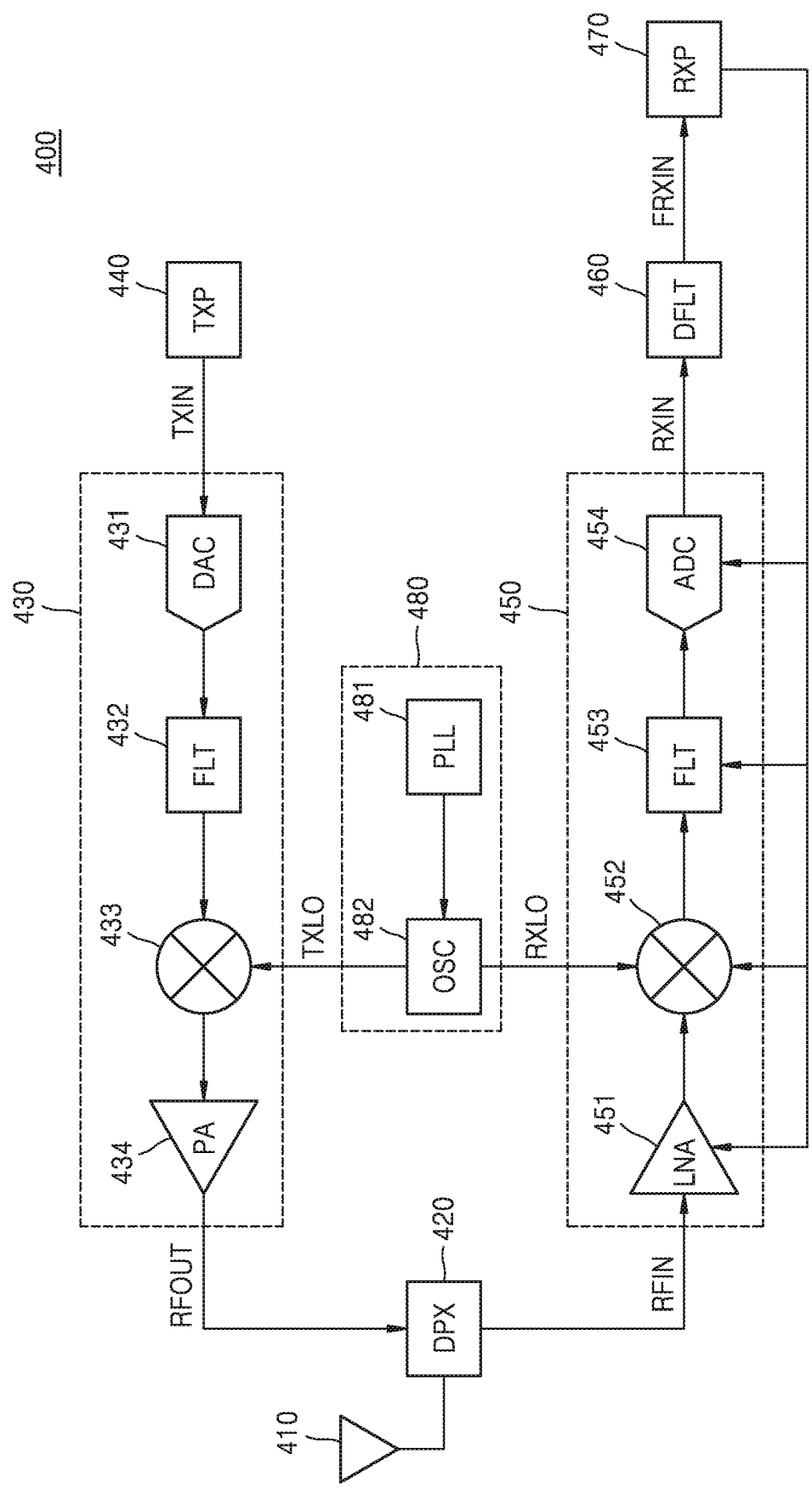
FIG. 4 is a diagram for describing in detail an embodiment of the communication device illustrated in FIG. 3A.
Figure 5:
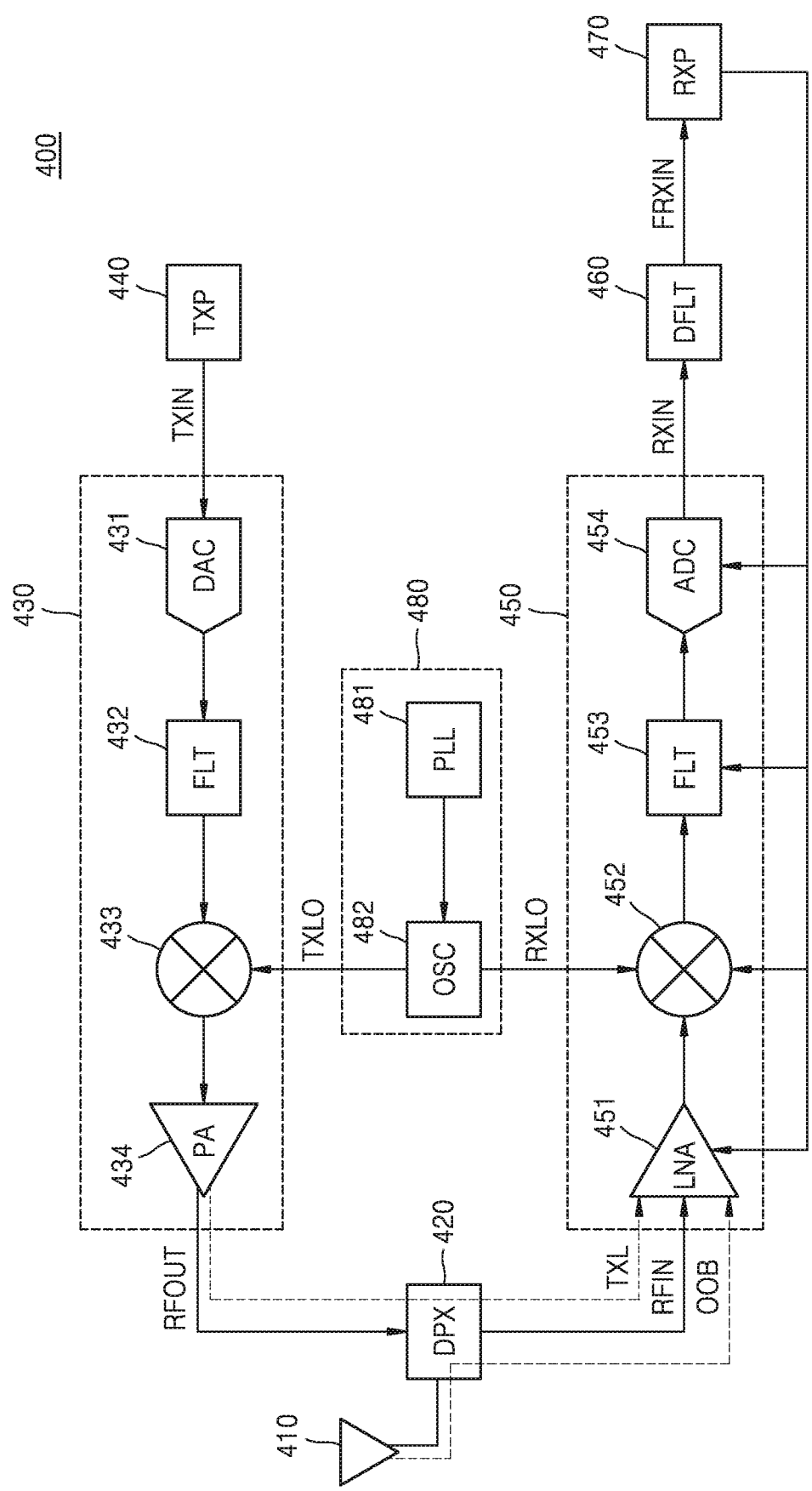
FIG. 5 is a diagram for describing an out-of-band blocker and a leakage transmission input signal.

FIG. 4 is a diagram for describing in detail an embodiment of the communication device illustrated in FIG. 3A, and FIG. 5 is a diagram for describing an out-of-band blocker and a leakage transmission input signal.

Referring to FIG. 4, a communication device 400 may include an antenna 410, a transmission/reception duplexer 420, a transmitter 430, a transmission processor 440, a receiver 450, a digital filter 460, a reception processor 470, and an oscillation circuit module 480. The antenna 410, the transmission/reception duplexer 420, the transmission processor 440, and the digital filter 460 may be the same as the antenna 310, the transmission/reception duplexer 321, the transmission processor 330, and the digital filter 340 each described above with reference to FIG. 3A.

In an embodiment, the transmitter 430 may include a plurality of transmission blocks. The plurality of transmission blocks are dependently connected (cascaded) to one another. Referring to FIG. 4, for example, the transmitter 430 may include a digital-to-analog converter 431, a transmission analog filter 432, a transmission mixer 433, and a power amplifier 434. The digital-to-analog converter 431 may convert a transmission input signal TXIN, which is a digital signal, into an analog signal. The transmission analog filter 432 may remove noise of the analog signal. The transmission mixer 433 may change a frequency of a noise-removed analog signal based on a frequency of a transmission reference clock TXLO. The power amplifier 434 may amplify power of a frequency-changed analog signal and may output a power-amplified analog signal to an RF output signal RFOUT.

In an embodiment, the receiver 450 may include a dependently connected (cascaded) plurality of reception blocks. Referring to FIG. 4, for example, the receiver 450 may include a low noise amplifier 451, a reception mixer 452, a reception analog filter 453, and an analog-to-digital converter 454. The low noise amplifier 451 may amplify an RF input signal RFIN. The reception mixer 452 may change a frequency of the RF input signal RFIN based on a frequency of a reception reference clock RXLO. The reception analog filter 453 may remove noise of the RF input signal RFIN. The analog-to-digital converter 454 may convert the RF input signal RFIN, which is an analog signal, into the reception input signal RXIN, which is a digital signal, and may output the transmission input signal TXIN to the digital filter 460.

The reception processor 470 may adjust a reception characteristic parameter of at least one of the low noise amplifier 451, the reception mixer 452, the reception analog filter 453, and the analog-to-digital converter 454.

The oscillation circuit module 480 may include a phase locked loop circuit 481 and an oscillator 482.

Although not shown, the communication device 400 may further include an external low noise amplifier.

According to the above description, an out-of-band blocker may be detected even without a front-end to digital path and digital blocks. Therefore, operation performance may be improved and the manufacturing cost may be reduced.

Referring to FIG. 5, when the transmitter 430 outputs the RF output signal RFOUT based on the transmission input signal TXIN, a leakage transmission input signal TXL may be generated. The leakage transmission input signal TXL may be input to the low noise amplifier 451 through the transmission/reception duplexer 420. Additionally, or alternatively, an out-of-band blocker OOB may be additionally input to the low noise amplifier 451 through the antenna 410. In this case, to improve linearity, reception characteristic parameters of a plurality of reception blocks included in the receiver 450 may be adjusted.

Figure 6:
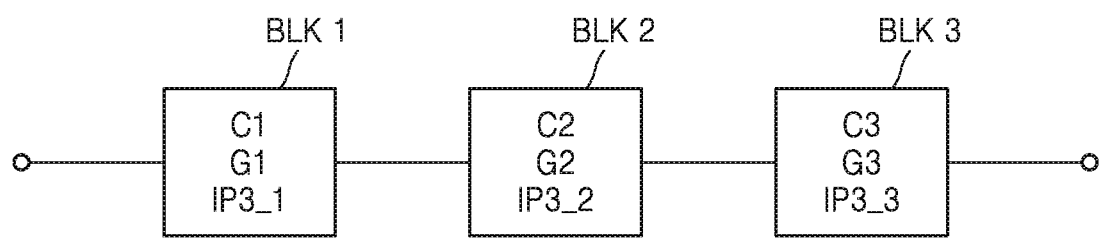
FIG. 6 is a diagram for describing a characteristic parameter and blocks included in a radio frequency (RF) chain according to an embodiment.

FIG. 6 is a diagram for describing a characteristic parameter and blocks included in an RF chain according to an embodiment. FIG. 6 shows a plurality of reception blocks and a reception characteristic parameter of a reception block.

Referring to FIG. 6, in an embodiment, the RF chain may include a plurality of reception blocks. For example, the RF chain may include first to third blocks BLK1 to BLK3. The first to third blocks BLK1 to BLK3 may be reception blocks included in a receiver (for example, 450 illustrated in FIG. 4). The first to third blocks BLK1 to BLK3 may be, for example, the low noise amplifier 451, the reception mixer 452, and the reception analog filter 453. However, the inventive concept is not limited thereto.

Each of the first to third blocks BLK1 to BLK3 may have at least one characteristic parameter. For example, when each of the first to third blocks BLK1 to BLK3 is a reception block, the first block BLK1 may have a first current C1, a first gain G1, and a first feedback factor IP3_1. In this case, a reception characteristic parameter of the first block BLK1 may have at least one of the first current C1, the first gain G1, and the first feedback factor IP3_1. Likewise, the second block BLK2 may have a second current C2, a second gain G2, and a second feedback factor IP3_2, and the third block BLK3 may have a third current C3, a third gain G3, and a third feedback factor IP3_3. Here, a current of a block may be a current used by a corresponding block, or may be a current consumed by a corresponding block. For example, the first current C1 may be a current used by the first block BLK1.

The first to third blocks BLK1 to BLK3 may be cascaded. Therefore, total IP3 may be calculated as an indicator representing linearity as expressed in the following Equation 1.

$$\frac{1}{IP3\_\text{total}} = \frac{G1}{IP3\_1} + \frac{G2}{IP3\_2} + \frac{G3}{IP3\_3} \quad (1)$$

In this case, IP3_total may denote total IP3.

Additionally, or alternatively, the reception processor 470 may adjust characteristic parameters of the first to third blocks BLK1 to BLK3. For example, when the characteristic parameters of the first to third blocks BLK1 to BLK3 are changed, the total IP3 may be calculated as expressed in the following Equation 2.

$$\frac{1}{IP3\_\text{total}} = \frac{1}{IP3\_1} + \frac{G1}{IP3\_2} + \frac{G1G2}{IP3\_3} \quad (2)$$

Figure 7:
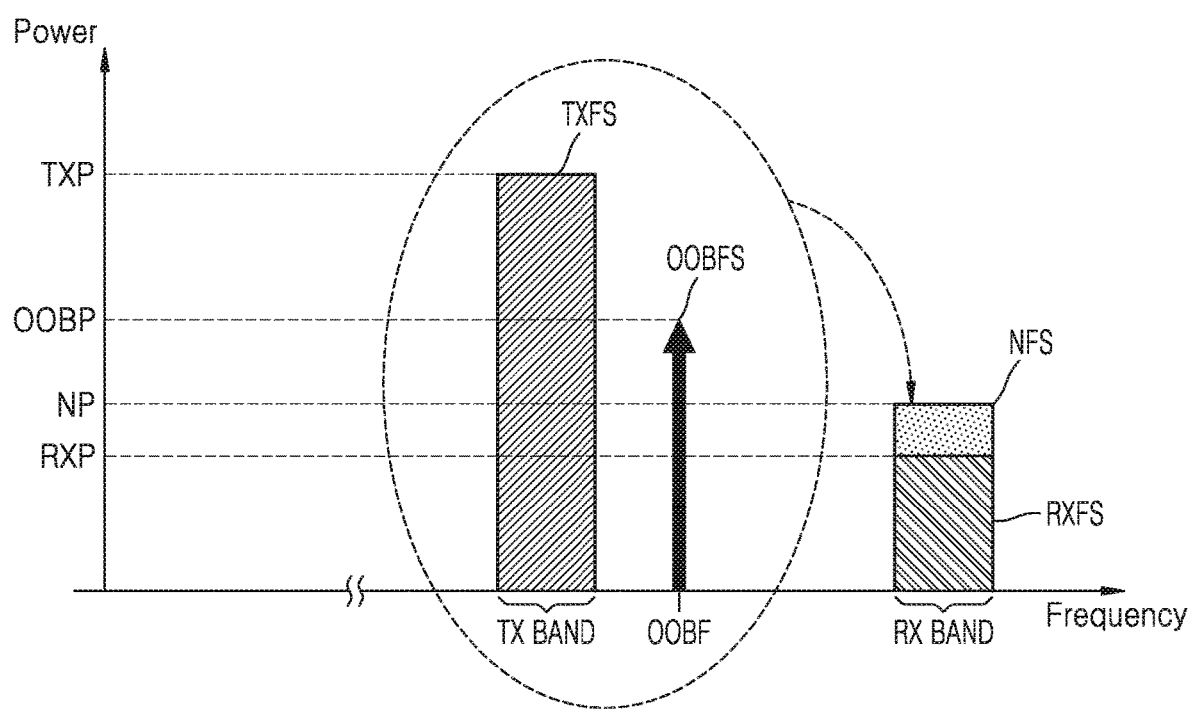
FIG. 7 is a diagram for describing a frequency spectrum of each of a transmission input signal, an out-of-band blocker, and a reception input signal.

FIG. 7 is a diagram for describing a frequency spectrum of each of a transmission input signal, an out-of-band blocker, and a reception input signal.

Referring to FIGS. 5 and 7, the abscissa axis may represent a frequency, and the ordinate axis may represent an amplitude (or power). A unit of a frequency may be Hz, and a unit of an amplitude may be dB. However, the inventive concept is not limited thereto.

A transmission frequency spectrum TXFS may be a frequency spectrum of a transmission input signal TXIN. The transmission frequency spectrum TXFS may have a transmission bandwidth TX BAND and a transmission amplitude TXP.

A blocker frequency spectrum OOBFS may be a blocker frequency spectrum obtained by performing an FFT on a frequency spectrum of an out-of-band blocker OOB. The out-of-band blocker OOB may be intermittently input by the receiver 450 unlike the leakage transmission input signal TXL. Additionally, or alternatively, the out-of-band blocker OOB may be a continuous wave with a single frequency. The blocker frequency spectrum OOBFS may have a blocker frequency OOBF, which is a single frequency, and a blocker amplitude OOBP.

A reception frequency spectrum RXFS may be a frequency spectrum of an RF input signal RFIN amplified by the low noise amplifier 451. The reception frequency spectrum RXFS may have a reception bandwidth RX BAND and a reception amplitude RXP.

The out-of-band blocker OOB and the leakage transmission input signal TXL based on the transmission input signal TXIN may be input to the receiver 450. Therefore, the transmission frequency spectrum TXFS and the blocker frequency spectrum OOBFS may be reflected in the reception frequency spectrum RXFS as in-channel noise. In this case, a noise frequency spectrum NFS with a bandwidth such as the reception bandwidth RX BAND of the reception frequency bandwidth RXFS may be generated. Based on the noise frequency spectrum NFS, the transmission amplitude RXP may increase by a noise amplitude NP.

Figure 8:
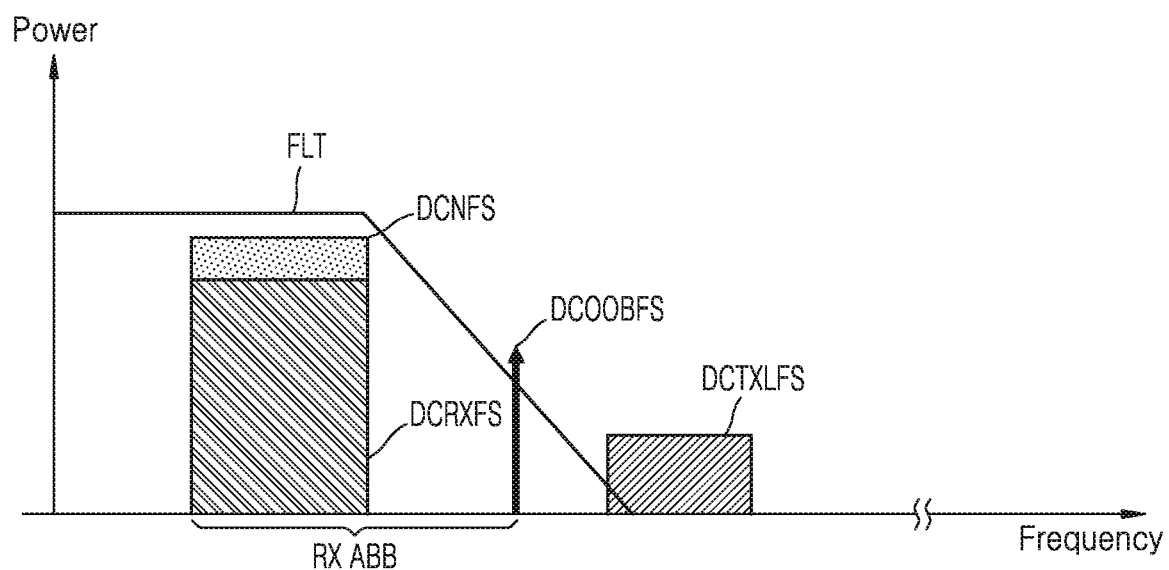
FIG. 8 is a diagram for describing down-converted frequency spectrums.

FIG. 8 is a diagram for describing down-converted frequency spectrums.

Referring to FIGS. 5, 7, and 8, a down noise frequency spectrum DCNFS, a down reception frequency spectrum DCRXFS, a down blocker frequency spectrum DCRXFS, a down blocker frequency spectrum DCOOBFS, and a down leakage transmission frequency spectrum DCTXLFS.

The down noise frequency spectrum DCNFS and the down reception frequency spectrum DCRXFS may be included in a reception analog baseband RX ABB. Additionally, or alternatively, the down blocker frequency spectrum DCOOBFS may be further included in the reception analog baseband RX ABB.

The down leakage transmission frequency spectrum DCTXLFS may be filtered by the reception analog filter 453. Additionally, or alternatively, the down blocker frequency spectrum DCOOBFS may be filtered by the reception analog filter 453. For example, referring to FIG. 8, a filter FLT for filtering may be a low pass filter, but the inventive concept is not limited thereto.

When a bandwidth of the down noise frequency spectrum DCNFS is the same as a bandwidth of the down reception frequency spectrum DCRXFS, an amplitude of the down noise frequency spectrum DCNFS may be relatively low. Therefore, detecting the down noise frequency spectrum DCNFS may be difficult. To more easily detect the down noise frequency spectrum DCNFS, the down noise frequency spectrum DCNFS with a relatively narrow bandwidth and a relatively large amplitude may be used.

Figure 9A:
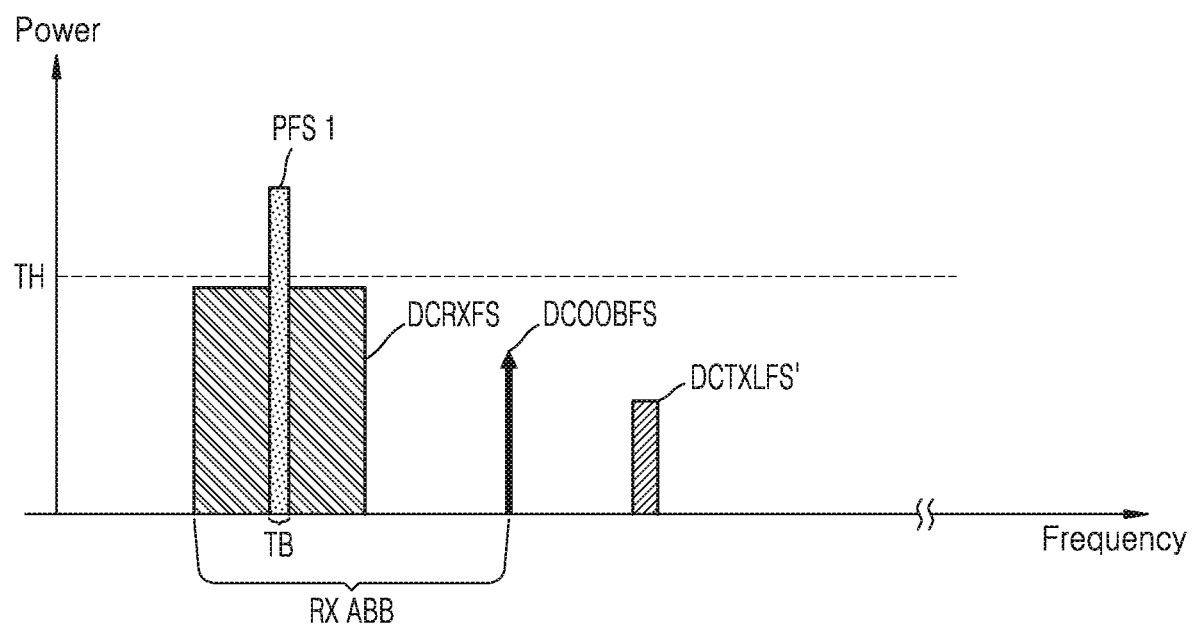
FIGS. 9A and 9B are diagrams for describing embodiments that detect a peaked frequency spectrum.
Figure 9B:
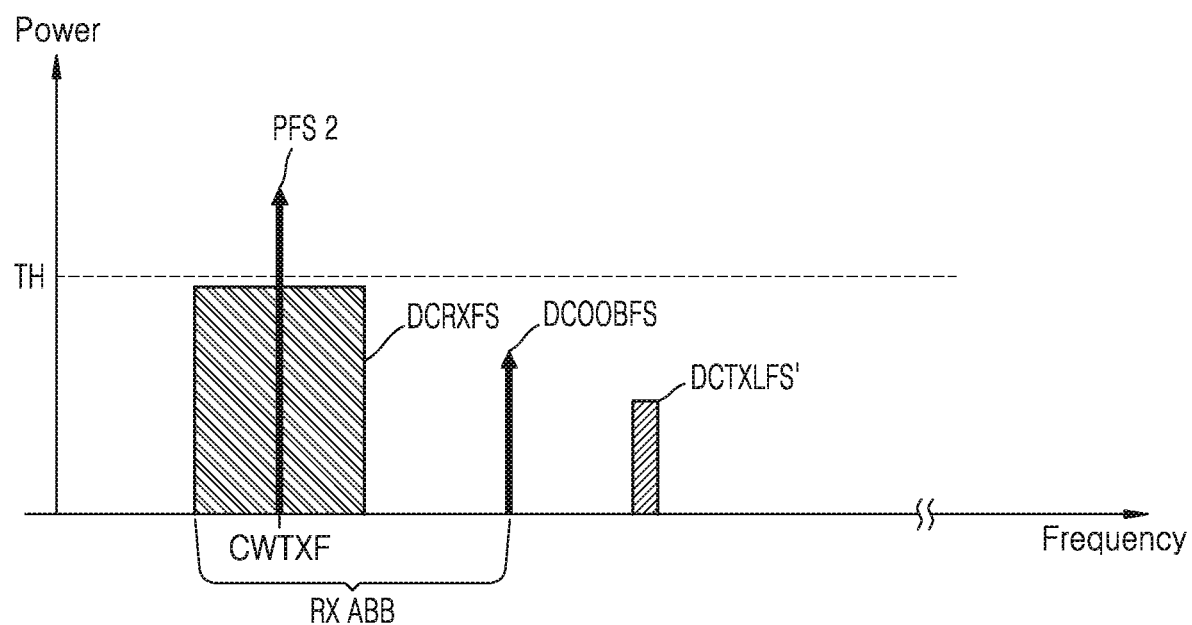

FIGS. 9A and 9B are diagrams for describing embodiments that detect a peaked frequency spectrum.

Referring to FIGS. 4, 8, and 9A, the transmission processor 440 may output the second transmission input signal. The second transmission input signal may be a signal for sharply implementing a shape of the down noise frequency spectrum DCNFS.

The second transmission input signal, as described above, may have average power of the first transmission input signal and may have a second amplitude greater than a first amplitude of the first transmission input signal. Accordingly, a communication state may be maintained. Therefore, communication quality may not be reduced.

In an embodiment, the second transmission input signal may include a second resource block. In this case, a size of the second resource block may be less than that of the first resource block of the first transmission input signal.

In an embodiment, the reception processor 470 may perform an FFT on the reception input signal RXIN. Referring to FIG. 9A, for example, a shape of the down noise frequency spectrum DCNFS may be changed to a shape of a first peaked frequency spectrum PFS 1. The first peaked frequency spectrum PFS 1 may have a bandwidth TB and an amplitude.

In an embodiment, the reception processor 470 may detect, as a peaked frequency spectrum, a frequency spectrum, greater than or equal to at least one predetermined reference amplitude, among frequency spectrums generated as a result of an FFT. The reference amplitude, as illustrated in FIG. 9A, may be a single reference amplitude TH. Referring to FIG. 9A, for example, the first peaked frequency spectrum PFS 1 among frequency spectrums PFS 1, DCRXFS, DCOOBFS, DCTXLFS' generated as a result of an FFT may be greater than the single reference amplitude TH.

In another embodiment, the reception processor 470 may compare an amplitude of the first peaked frequency spectrum PFS 1 with the at least one predetermined reference amplitude.

When the first peaked frequency spectrum PFS 1 is detected, the reception processor 470 may adjust a reception characteristic parameter. Alternatively, the reception processor 470 may adjust the reception characteristic parameter based on a comparison result between an amplitude of the first peaked frequency spectrum PFS 1 and the single reference amplitude TH.

The reception processor 470 may repeatedly adjust the reception characteristic parameter until the amplitude of the first peaked frequency spectrum PFS 1 is less than the single reference amplitude TH.

Accordingly, an out-of-band blocker that is intermittently input may be easily detected. Therefore, linearity may be improved. Additionally, or alternatively, when the second transmission input signal has a continuous wave with a single frequency, a shape of the down noise frequency spectrum DCNFS may be sharply modified.

Referring to FIGS. 4, 8, and 9B, as described above, the second transmission input signal may have an average power of the first transmission input signal and may have the second amplitude greater than the first amplitude of the first transmission input signal. In another embodiment, the second transmission input signal may be a continuous wave.

A shape of the down noise frequency spectrum DCNFS may be changed to a shape of a second peaked frequency spectrum PFS 2. The second peaked frequency spectrum PFS 2 may have a single transmission frequency CWTXF and an amplitude. An amplitude of the second peaked frequency spectrum PFS 2 may be greater than that of the first peaked frequency spectrum PFS 1.

The reception processor 470 may detect the second peaked frequency spectrum PFS 2 greater than or equal to the single reference amplitude TH, among the frequency spectrums PFS 1, DCRXFS, DCOOBFS, DCTXLFS' generated as the result of the FFT. Alternatively, the reception processor 470 may compare an amplitude of the second peaked frequency spectrum PFS 2 with the single reference amplitude TH.

Accordingly, an out-of-band blocker that is intermittently input may be more easily detected. Therefore, linearity may be improved. Additionally, or alternatively, in a case where an amplitude of a peaked frequency spectrum and the single reference amplitude TH are used for adjusting an out-of-band blocker and a reception characteristic parameter, an amplitude of the peaked frequency spectrum may not be accurately seen.

Figure 10:
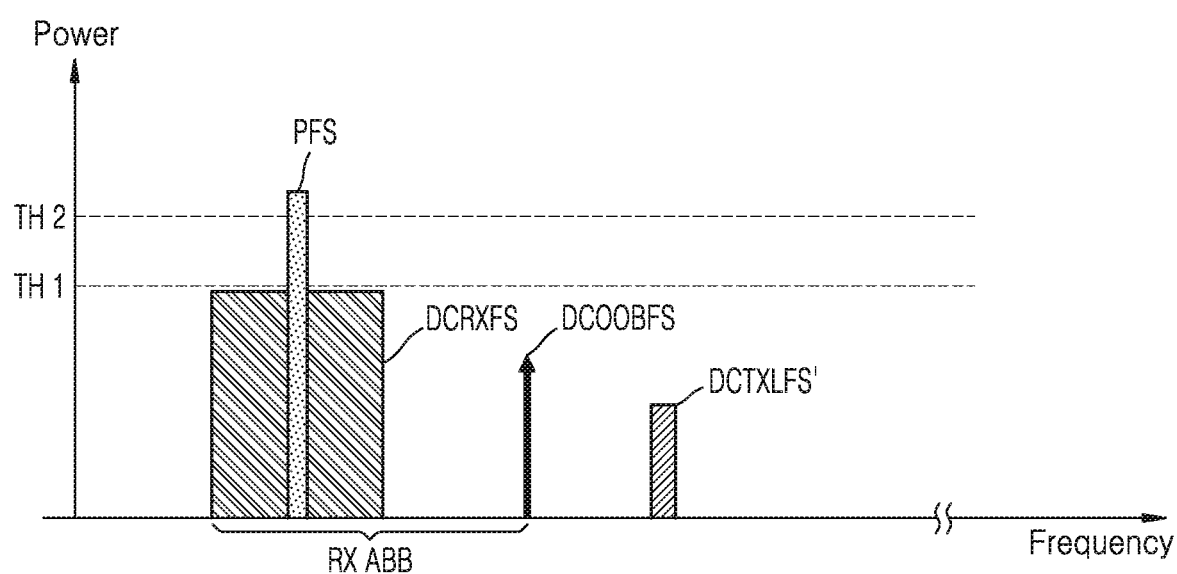
FIG. 10 is a diagram for describing an embodiment that changes the amount of adjustment of a reception characteristic parameter based on a peaked frequency spectrum.

FIG. 10 is a diagram for describing an embodiment to change the amount of adjustment of a reception characteristic parameter based on a peaked frequency spectrum.

Referring to FIGS. 4, 8, and 10, a reference amplitude may be provided in plurality, and the plurality of reference amplitudes may differ. Referring to FIG. 10, for example, the plurality of reference amplitudes may include a first reference amplitude TH 1 and a second reference amplitude TH 2 higher than the first reference amplitude TH 1. However, the inventive concept is not limited thereto. As the number of reference amplitudes increases, an amplitude of the peaked frequency spectrum PFS may be more accurately detected.

The peaked frequency spectrum PFS illustrated in FIG. 10 may be the first peaked frequency spectrum PFS 1 illustrated in FIG. 9A, but is not limited thereto and may be the second peaked frequency spectrum PFS 2 illustrated in FIG. 9B.

In an embodiment, the reception processor 470 may compare the amplitude of the peaked frequency spectrum PFS with the first and second reference amplitudes TH 1 and TH 2 to detect the amplitude of the peaked frequency spectrum PFS and may adjust the amount of adjustment of a reception characteristic parameter based on the detected amplitude. Referring to FIG. 10, for example, when the amplitude of the peaked frequency spectrum PFS is greater than or equal to the second reference amplitude TH 2, the reception processor 470 may set a second adjustment amount greater than a first adjustment amount. As another example, when the amplitude of the peaked frequency spectrum PFS is greater than or equal to the first reference amplitude TH 1 and less than the second reference amplitude TH 2, the reception processor 470 may set the first adjustment amount.

According to the above description, because the amount of adjustment of a reception characteristic parameter is set based on an amplitude of a peaked frequency spectrum, an operation load (or a working load) may be reduced, and moreover, linearity may be more improved.

Figure 11:
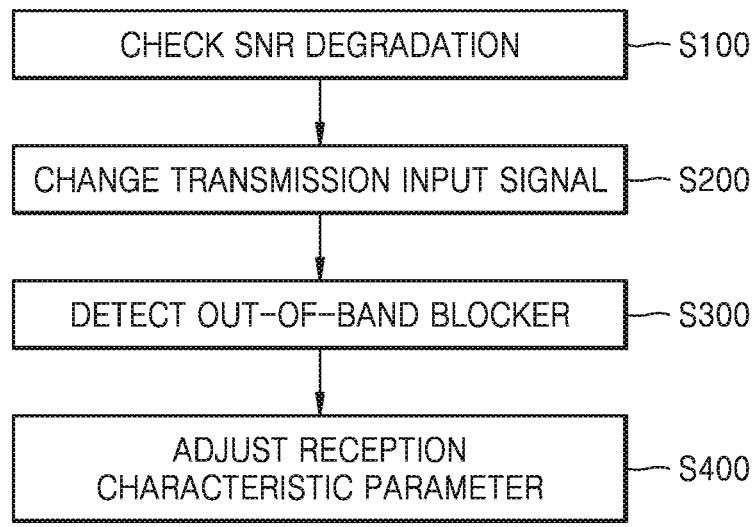
FIG. 11 is a flowchart of an operating method of a communication device, according to an embodiment.

FIG. 11 is a flowchart of an operating method of a communication device 100, according to an embodiment.

Referring to FIG. 11, in operation S100, the communication device 100 checks a degradation in an SNR. For example, the reception processor 132 may check SNR degradation based on a reception input signal generated by the RF chain 120.

In operation S200, the communication device 100 changes a transmission input signal. For example, the transmission processor 131 may change a first transmission input signal to a second transmission input signal in response to SNR degradation being checked. The second transmission input signal may have the same average power as that of the first transmission input signal and may have a second amplitude greater than a first amplitude of the first transmission input signal. In an embodiment, the first transmission input signal may include a first resource block and may include a second resource block with a size less than that of the first resource block. In another embodiment, the first transmission input signal may include the first resource block, and the second transmission input signal may be a continuous wave.

In operation S300, the communication device 100 detects an out-of-band blocker. For example, the reception processor 132 may detect a peaked frequency spectrum based on a reception input signal to detect an out-of-band blocker. The peaked frequency spectrum may be greater than or equal to at least one predetermined reference amplitude (for example, the first reference amplitude TH 1 illustrated in FIG. 10).

In operation S400, the communication device 400 adjusts the reception characteristic parameter. For example, the reception processor 132 may adjust a reception characteristic parameter of the RF chain 120 based on an amplitude of the peaked frequency spectrum.

Figure 12:
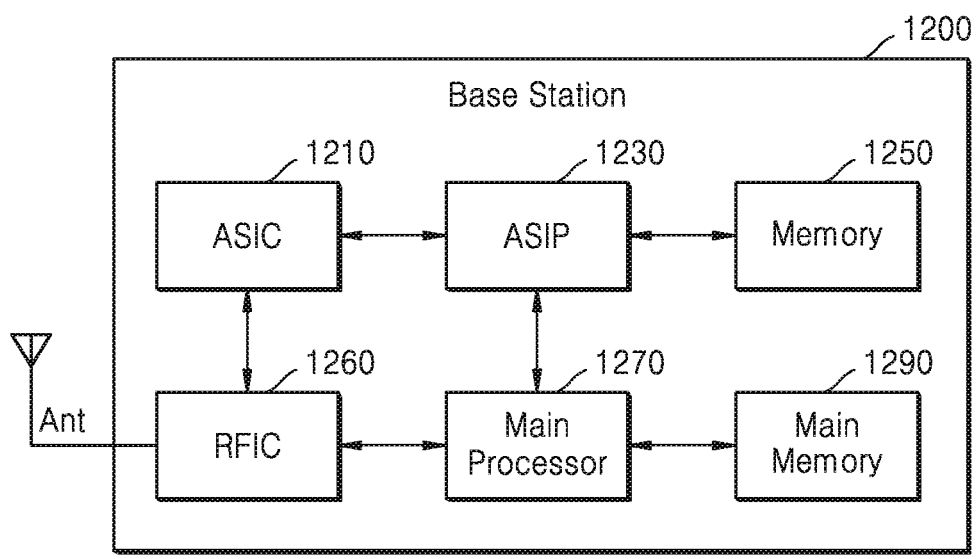
FIG. 12 is a block diagram illustrating a base station according to an embodiment.

FIG. 12 is a block diagram illustrating a base station 1200 according to an embodiment.

Referring to FIG. 12, the base station 1200 may include a modem and a radio frequency integrated circuit (RFIC) 1260, and the modem may include an application specific integrated circuit (ASIC) 1210, an application specific instruction set processor (ASIP) 1230, a memory 1250, a main processor 1270, and a main memory 1290.

The RFIC 1260 may be connected to an antenna Ant and may receive a signal from the outside or may transmit a signal to the outside by using a wireless communication network. The ASIP 1230 may be an integrated circuit that is customized for certain utility, supports a dedicated instruction set for a certain application, and may execute an instruction included in the instruction set. The memory 1250 may be a non-transitory storage device, may communicate with the ASIP 1230, and may store a plurality of instructions executed by the ASIP 1230. For example, as a non-transitory example, the memory 1250 may include an arbitrary-type memory accessible by the ASIP 1230 like random access memory (RAM), read only memory (ROM), tape, a magnetic disk, an optical disk, a volatile memory, a non-volatile memory, and a combination thereof.

The main processor 1270 may execute a plurality of instructions to control the base station 1200. For example, the main processor 1270 may control the ASIC 1210 and the ASIP 1230 and may process data received over the wireless communication network. The main memory 1290, a non-transitory storage device, may communicate with the main processor 1270 and may store the plurality of instructions executed by the main processor 1270. For example, as a non-transitory example, the main memory 1290 may include an arbitrary-type memory accessible by the main processor 1270 like RAM, ROM, tape, a magnetic disk, an optical disk, a volatile memory, a non-volatile memory, and a combination thereof.

Figure 13:
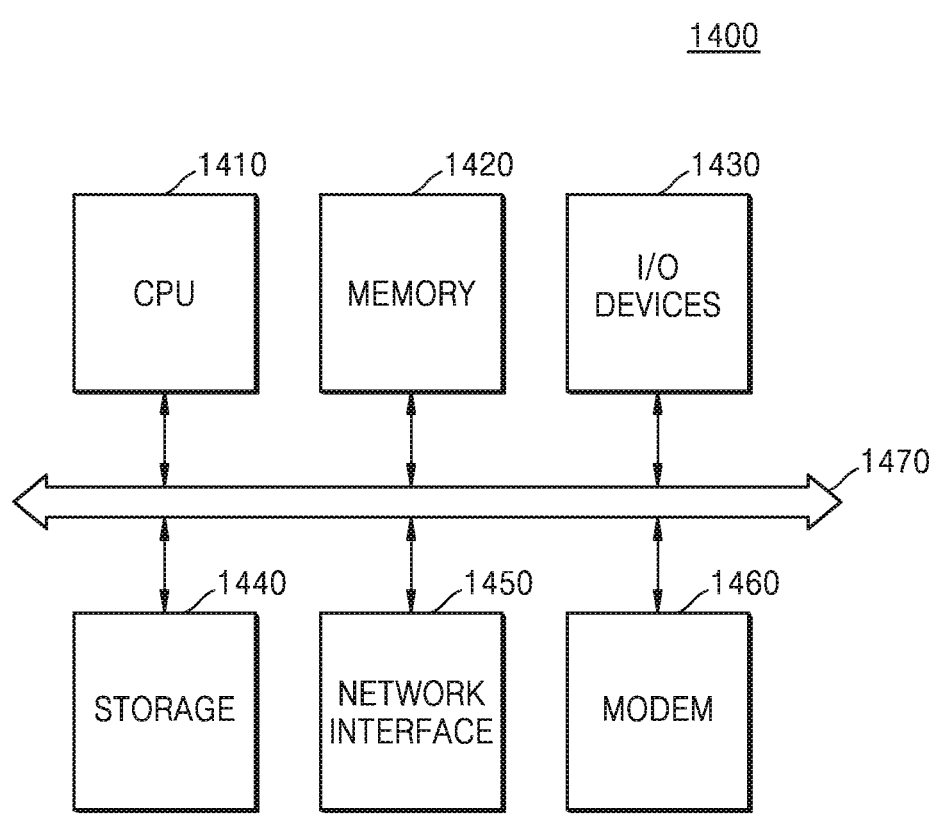
FIG. 13 is a block diagram illustrating a computing system according to an embodiment.

FIG. 13 is a block diagram illustrating a computing system 1400 according to an embodiment.

Referring to FIG. 13, the computing system 1400 may include a stationary computing system like a desktop computer, a workstation, and a server, or may include a portable computing system like a laptop computer. Additionally, or alternatively, the computing system 1400 may include a semiconductor device implemented with a semiconductor. The computing system 1400 may include a processor 1410, a memory 1420, a plurality of input/output devices 1430, a storage device 1440, a network interface 1450, and a modem 1460. The processor 1410, the memory 1420, the input/output devices 1430, the storage device 1440, the network interface 1450, and the modem 1460 may be connected to a bus 1470 and may communicate with one another through the bus 1470.

The processor 1410 may be referred to as a processing unit, and for example, may include at least one core for executing an arbitrary instruction set (for example, Intel Architecture-32 (IA-32), 64-bit extension IA-32, x86-64, PowerPC, Sparc, MIPS, ARM, IA-64, etc.) like a microprocessor, an application processor (AP), a digital signal processor (DSP), and a graphics processing unit (GPU). For example, the processor 1410 may access the memory 1420 through the bus 1470 and may execute instructions stored in RAM or ROM.

The memory 1420 may include dynamic RAM (DRAM) and a volatile memory (e.g., RAM), or may include flash memory and a non-volatile memory (e.g., ROM). The input/output devices 1430 may include an input device such as a keyboard or a pointing device and may include an output device such as a printer. The storage device 1440 may store data to be processed by the processor 1410, or may store data obtained through processing by the processor 1410. For example, the processor 1410 may process data stored in the storage device 1440 to generate data and may store the generated data in the storage device 1440.

The network interface 1450 may provide access corresponding to a network outside the computing system 1400. For example, the network may include a plurality of computing systems and a plurality of communication links, and the communication links may include wired links, optical links, wireless links, or arbitrary links of a different type.

The modem 1460 may perform wireless communication or wired communication with an external device. For example, the modem 1460 may perform Ethernet communication, near field communication (NFC), radio frequency identification (RFID) communication, mobile communication, memory card communication, and universal serial bus (USB) communication, but is not limited thereto.

While the inventive concept has been particularly shown and described with reference to embodiments thereof, it will be understood that various changes in form and details may be made therein without departing from the spirit and scope of the following claims.

What is claimed is:

1. A communication device comprising:
an antenna;
a transmission processor configured to output a second transmission input signal having the same average power as average power of a first transmission input signal and a second amplitude that is greater than a first amplitude of the first transmission input signal;

a radio frequency (RF) chain configured to output an RF output signal to be transmitted through the antenna based on a transmission input signal provided from the transmission processor, and to output a reception input signal based on a signal received through the antenna; and a reception processor configured to check an out-of-band blocker by detecting a peaked frequency spectrum based on the reception input signal and to adjust a reception characteristic parameter of the RF chain based on an amplitude of the peaked frequency spectrum.

2. The communication device of claim 1, wherein the reception processor is configured to calculate a signal to noise ratio (SNR) based on the reception input signal, compare the SNR with a reference SNR, and output a comparison result signal to the transmission processor, and the transmission processor is configured to output the first transmission input signal to the RF chain when the SNR is higher than or equal to the reference SNR, and to output the second transmission input signal to the RF chain when the SNR is lower than the reference SNR.

3. The communication device of claim 1, wherein the transmission processor is configured to output the second transmission input signal to the RF chain in a period where the communication device prepares for a communication operation.

4. The communication device of claim 1, wherein the transmission processor is configured to output the first transmission input signal to the RF chain in a period where the communication device prepares for a communication operation and to output the second transmission input signal to the RF chain in a period where the communication device prepares for the communication operation.

5. The communication device of claim 1, wherein the reception processor is configured to perform a fast Fourier transform (FFT) on the reception input signal and to detect, as the peaked frequency spectrum, a frequency spectrum, that is greater than or equal to at least one reference amplitude among frequency spectrums generated as a result of the FFT.

6. The communication device of claim 5, wherein the at least one reference amplitude is a single reference amplitude, and the reception processor is configured to adjust the reception characteristic parameter based on a comparison result between an amplitude of the peaked frequency spectrum and the single reference amplitude.

7. The communication device of claim 6, wherein the reception processor is configured to repeatedly adjust the reception characteristic parameter until an amplitude of the peaked frequency spectrum is less than the single reference amplitude.

8. The communication device of claim 5, wherein the at least one reference amplitude comprises a plurality of reference amplitudes that differ from each other, the reception processor is configured to compare an amplitude of the peaked frequency spectrum with the plurality of reference amplitudes to detect an amplitude of the peaked frequency spectrum, and to set an amount of adjustment of the reception characteristic parameter based on the detected amplitude.

9. The communication device of claim 8, wherein the plurality of reference amplitudes comprise a first reference amplitude and a second reference amplitude that is higher than the first reference amplitude, and the reception processor is configured to, when an amplitude of the peaked frequency spectrum is greater than or equal to the first reference amplitude and less than the second reference amplitude, set a first adjustment amount and when an amplitude of the peaked frequency spectrum is greater than or equal to the second reference amplitude, set a second adjustment amount that is greater than the first adjustment amount.

10. The communication device of claim 1, wherein the RF chain comprises:

a plurality of transmission blocks configured to output the RF output signal based on a transmission input signal provided from the transmission processor;

a duplexer configured to provide the RF output signal to the antenna and to output a signal, received through the antenna, as an RF input signal; and a plurality of reception blocks configured to provide the received signal to the reception processor based on the RF input signal, each of the plurality of reception blocks comprises a consumed current, a gain, and a feedback factor, and the reception characteristic parameter is at least one of the consumed current, the gain, and the feedback factor.

11. The communication device of claim 1, wherein the first transmission input signal comprises a first resource block, and the second transmission input signal comprises a second resource block having a size that is less than a size of the first resource block.

12. The communication device of claim 1, wherein the first transmission input signal comprises a first resource block, and the second transmission input signal comprises a continuous wave having a single frequency.

13. A communication device comprising:

an antenna;

a modem configured to output a transmission input signal and to process a reception input signal; and a radio frequency (RF) chain configured to output an RF output signal that is to be transmitted through the antenna, based on the transmission input signal and to output a reception input signal based on a signal received through the antenna, wherein the modem is configured to calculate a signal to noise ratio (SNR) based on the reception input signal, to change a first transmission input signal to a second transmission input signal based on whether the SNR is less than a reference SNR, and to detect a peaked frequency spectrum based on the reception input signal and to adjust a reception characteristic parameter of the RF chain based on an amplitude of the peaked frequency spectrum.

14. The communication device of claim 13, wherein the second transmission input signal has the same average power as average power of the first transmission input signal and a second amplitude that is greater than a first amplitude of the first transmission input signal.

15. The communication device of claim 13, wherein the modem is configured to output the second transmission input signal to the RF chain in a period where the communication device prepares for a communication operation.

16. The communication device of claim 13, wherein the modem is configured to perform a fast Fourier transform (FFT) on the reception input signal and to detect, as the peaked frequency spectrum, a frequency spectrum, that is greater than or equal to at least one reference amplitude, among frequency spectrums generated as a result of the FFT.

17. The communication device of claim 16, wherein the at least one reference amplitude is a single reference amplitude, and the modem is configured to adjust the reception characteristic parameter based on a comparison result between an amplitude of the peaked frequency spectrum and the single reference amplitude.

18. The communication device of claim 16, wherein the at least one reference amplitude comprises a plurality of reference amplitudes that differ from each other, the modem is configured to compare an amplitude of the peaked frequency spectrum with the plurality of reference amplitudes to detect an amplitude of the peaked frequency spectrum, and to set an amount of adjustment of the reception characteristic parameter based on the detected amplitude.

19. A method comprising:

checking a degradation in a signal to noise ratio (SNR) of a reception input signal generated by an RF chain;

changing a first transmission input signal to a second transmission input signal based on the degradation, wherein the second transmission input signal has a same average power as the first transmission input signal and an amplitude that is greater than the first transmission input signal;

determining that a peaked frequency spectrum of noise in the reception input signal is greater than or equal to a reference amplitude; and adjusting a reception characteristic parameter of the RF chain based on the peaked frequency spectrum.

20. The operating method of claim 19, wherein the first transmission input signal comprises a first resource block, and the second transmission input signal comprises a signal, including a second resource block having a size that is less than a size of the first resource block, or a continuous wave having a single frequency.

* * * * *